US008607135B2

(12) United States Patent  (10) Patent No.: US 8,607,135 B2
Sponheim et al.  (45) Date of Patent: *Dec. 10, 2013

(54) RADIO STATION BUTTONS

(75) Inventors: Tom A. Sponheim, Seattle, WA (US);
Bella Acharya, Kirkland, WA (US);
Jack Litewka, Seattle, WA (US); **Jamie
A. Spooner**, Redmond, WA (US);
William A. Spencer, Redmond, WA
(US); Stephen H. Buroker, Issaquah,
WA (US)

(73) Assignee: Microsoft Corporation, Redmond, WA
(US)

( * ) Notice: Subject to any disclaimer, the term of this
patent is extended or adjusted under 35
U.S.C. 154(b) by 605 days.

This patent is subject to a terminal disclaimer.

(21) Appl. No.: 12/054,700

(22) Filed: Mar. 25, 2008

(65) Prior Publication Data

US 2008/0244441 A1  Oct. 2, 2008

Related U.S. Application Data

(63) Continuation of application No. 10/464,678, filed on Jun. 18, 2003, now Pat. No. 7,356,765, which is a continuation of application No. 09/481,843, filed on Jan. 14, 2000, now Pat. No. 6,639,610.

(51) Int. Cl.
*G06F 17/00* (2006.01)
(52) U.S. Cl.
USPC ............................ 715/206; 715/208; 715/250
(58) Field of Classification Search
USPC ......................................... 715/206, 208, 250
See application file for complete search history.

(56) References Cited

U.S. PATENT DOCUMENTS

| 5,774,670 | A | | 6/1998 | Montulli |
| 5,877,758 | A | * | 3/1999 | Seybold ........................ 715/866 |
| 6,031,989 | A | | 2/2000 | Cordell |
| 6,167,383 | A | | 12/2000 | Henson |
| 6,243,700 | B1 | | 6/2001 | Zellweger |
| 6,282,552 | B1 | * | 8/2001 | Thompson et al. ........... 715/234 |
| 6,338,059 | B1 | * | 1/2002 | Fields et al. ...................... 707/4 |
| 6,381,711 | B1 | * | 4/2002 | Chiang et al. ................... 714/48 |
| 6,480,852 | B1 | * | 11/2002 | Himmel et al. ................ 709/245 |
| 7,136,932 | B1 | * | 11/2006 | Schneider ..................... 709/245 |
| 2001/0012024 | A1 | * | 8/2001 | Rosin et al. .................... 345/841 |

(Continued)

OTHER PUBLICATIONS

Alwang, Greg, File it on the Web. (Claris' FileMaker Pro 4.0 provides cross-platform database management for the Web) (Software Review)(Evaluation) PC Magazine, v16, n22, p. 73(1) Dec. 16, 1997, ISSN: 0888-8507.*

(Continued)

*Primary Examiner* — Nathan Hillery
(74) *Attorney, Agent, or Firm* — Wolfe-SBMC

(57) ABSTRACT

Methods and a data structure for assigning URLs (e.g., to radio-station-streaming-media-content sources) to graphical objects (such as buttons) are disclosed. Zip codes are used to identify and assign geographically relevant URLs to buttons. A graphical user interface enables a user to select from a plurality of radio buttons and menu entries in order to identify search results satisfying the user's selection criteria. Information identifying a user's button assignments or preferences (such as the user's zip code) is stored in various data fields in a cookie data structure. The computer-executable instructions use the information contained in the data structure in order to assign the URL to the button each time the Web page is displayed.

13 Claims, 11 Drawing Sheets

(56) References Cited

U.S. PATENT DOCUMENTS

| | | | |
|---|---|---|---|
| 2001/0043235 A1 | 11/2001 | Best et al. | |
| 2002/0000468 A1* | 1/2002 | Bansal | 235/462.15 |
| 2002/0118638 A1 | 8/2002 | Donahue et al. | |
| 2005/0091111 A1 | 4/2005 | Green et al. | |
| 2005/0240472 A1* | 10/2005 | Postrel | 705/14 |

OTHER PUBLICATIONS

Getting the CVS message across. Chain Drug Review, v 20, n 21, p. 68(1) Dec. 7, 1998 ISSN: 0164-9914.*
Subway(R) Restaurants Media Menu. PR Newswire, p. 9132 Jul. 12, 1999.*
Website titled "Real Networks" at wysiwyg://4/http://www.real.com/.
Website titled "On Now Live Online Events" at http://www.onnow.com/.
Website titled "Directtv" at http://www.directTV.com/.
Website titled "Yahoo! Net Events" at http://events.yahoo.com/.
Website titled "broadcast.com Home" at wysiwyg://11/http://www.broadcast.com/.
Website titled "Web-Radio" at http://www.web-radio.com/index2.html.
Website titled "Imagine Radio" at http://www.imagineradio.com/.
Website titled "VideoSeeker" at wysiwyg://22/http://www.videoseeker.com/.
Website titled "When.com" at http://www.when.com/cgi-bin/gx.cgi/AppLogic+Login.
Website titled "ChannelSEEK" at http://www.channelseek.com/.
Website titled "Jump!" at http://www.jump.com/.
Website titled "ubl.com"—Music's Homepage at wysiwyg://41/http://www.ubl.com/fp.asp?layout=main_front_page.
www.wunderground.com, captured Nov. 15, 1999. The Weather Underground, Inc.
www.webradio.com, captured Nov. 28, 1999. BRS Media.
www.framesearch.net, captured Nov. 4, 1999. W3COM.
www.weather.com, captured Oct. 13, 1999. The Weather Channel Enterprises, Inc.
my.netscape.com, captured Feb. 18, 1999. Netscape.
www.broadcast.com/radio/, captured Oct. 4, 1999. Yahoo Inc.
Simon St. Laurent, "Cookies": 1998. The McGraw-Hill Companies, pp. 116-123.
"BSR Radio Dictionary," BSR Media, May 27, 1998, http://web.archive.org/web/19980527024509/http://www.radio-dictionary.com/ and linked sites, downloaded pp. 1-46.I.
"Weather Underground," The Weather Underground, Inc., Dec. 12, 1998, http://web.archive.org/web/19981212034213/http://www.wunderground.com/ and linked sites, downloaded pp. 1-8.
Graham, I.S., "HTML Sourcebook, A Complete Guide to HTML 3.2 and HTML Extensions," Third Edition, John Wiley & Sons, Inc., 1997, title and copyright page and pp. 272-276.
St. Laurent, S., "Cookies," McGraw-Hill, 1998, download on Apr. 2, 2002 from: http://emedia.netlibrary/nlreader/nlreader.dll?bookid=1873& . . . html, cover and copyright pages and pp. 116-123.

* cited by examiner

RADIO STATION BUTTONS

CROSS-REFERENCE TO RELATED APPLICATIONS

This application is a continuation of U.S. patent application Ser. No. 10/464,678, filed on Jun. 18, 2003, entitled "RADIO STATION BUTTONS", which is a continuation of U.S. patent application Ser. No. 09/481,843, filed on Jan. 14, 2000, entitled "RADIO STATION BUTTONS". The entireties of the aforementioned applications are incorporated herein by reference.

FIELD OF THE INVENTION

The present invention relates to the field of Web pages containing URLs that identify streaming-media-content sources and, in particular, to methods and data structures for assigning URLs on the Internet to graphical objects (such as buttons) displayed on Web pages.

BACKGROUND OF THE INVENTION

In recent years, there has been a tremendous proliferation of computers connected to a global network known as the Internet. A "client" computer connected to the Internet can download digital information from "server" computers connected to the Internet. Client application and operating system software executing on client computers typically accepts commands from a user and obtains data and services by sending requests to server applications running on server computers connected to the Internet. A number of protocols are used to exchange commands and data between computers connected to the Internet. The protocols include the Hypertext Transfer Protocol (HTTP), the File Transfer Protocol (FTP), the Simple Mail Transfer Protocol (SMTP), Gopher and other protocols.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents (a/k/a Web pages). A Web site may use one or more Web server computers that are able to store and distribute documents in one of a number of formats including the Hypertext Markup Language (HTML). An HTML document can contain text, graphics, audio clips and video clips, as well as metadata or commands providing formatting information. HTML documents also can include embedded links, such as URLs, that reference other data or Web pages located on the local computer or network server computers. "URL" is an abbreviation for "Uniform Resource Locator," the global address of documents and other resources on the World Wide Web.

FTP is the protocol used on the Internet for sending files. Further, SMTP is a protocol for sending e-mail messages between servers. Most e-mail systems that send mail over the Internet use SMTP to send messages from one server to another; the messages can then be retrieved with an e-mail client. In addition, SMTP is generally used to send messages from a mail client to a mail server.

Gopher is a system that pre-dates the World Wide Web for organizing and displaying files on Internet servers. A Gopher server presents its contents as a hierarchically structured list of files. With the ascendance of the Web, most Gopher databases are being converted to Web sites which can be more easily accessed via Web search engines.

A Web browser is a client application, software component, or operating system utility that communicates with server computers via FTP, HTTP and Gopher protocols. Web browsers receive Web documents (i.e., Web pages) from the network and present them to a user. Internet Explorer, available from Microsoft Corporation, of Redmond, Wash., is an example of a popular Web browser.

Recently, many users have started utilizing their Web browsers to locate streaming-media sources. After a streaming-media source is located, the Web browser works in conjunction with a media player in order to play the media on the client computer's monitor and/or speakers. An example of a popular media player is Windows Media Player, also available from Microsoft Corporation. A streaming-media source is a source (e.g., a URL) that "streams" media/data to a client computer. Streaming is a technique for transferring data such that it can be processed as a steady and continuous stream. Streaming technologies are becoming increasingly important with the growth of the Internet because most users do not have fast enough access to download large multimedia files quickly. With streaming, the Web browser or media player can start displaying the data before the entire file has been transmitted. An example of a streaming-media source is a radio station that "streams" its broadcast to users on the Internet. In this example, the streaming-media source (i.e., radio station) is loaded from the Internet and played on a client computer using the Windows Media Player.

Unfortunately, there are a number of problems with currently available Web pages that attempt to identify available streaming-media sources, such as radio stations. For example, the prior art usually provides one or more Web pages that contain myriad hyperlinks to various streaming-media sources. These Web pages are slow and are difficult to navigate. Some Web pages are hierarchical in that selection of one hyperlink leads a user to another Web page that contains even more choices. However, each time a selection is made, the entire Web page needs to be replotted (i.e., regenerated and redisplayed). Again, this method is inefficient as well as confusing to the user. Another problem is that users are unable to customize streaming-media content on Web pages. For example, prior-art Web pages do not allow users to identify their preferred streaming-media sources and do not provide users with preset buttons for quick navigation. Lastly, the prior art does not allow users to assign their preferred streaming-media sources to graphical objects depicted on the Web page. Similarly, the prior art is unable to remember a user's preferred streaming-media sources.

Accordingly, it is an object of the present invention to provide improved methods and data structures for assigning URLs on the Internet to graphical objects (such as buttons) displayed on Web pages. In short, this will help users to locate, place and use streaming-media sources.

SUMMARY OF THE INVENTION

The present invention is stored as computer-executable instructions on a computer-readable medium. One aspect of the present invention is a text box and at least one button displayed on a Web page. Using a Web browser, a user is allowed to manually enter a zip code into the text box. After manual entry of the zip code, at least one URL geographically relevant to the zip code is assigned to at least one graphical object, such as a button. The URL identifies a source of streaming-media content such as a radio station. Thus, for example, input of a zip code can cause the present invention to assign the URLs for radio stations within or in close proximity to the zip code to buttons displayed on the Web page.

This zip code can be stored in a data field in a cookie data structure. (A "cookie" is a message—code string—given to a Web browser by a Web server.) The present invention uses the zip code contained in the cookie data structure in order to assign URLs to buttons each time the Web page is displayed. After entry of a zip code, the zip-code text box can be replaced with a hyperlink that identifies the current zip-code selection and allows the user to modify the chosen zip code.

Another aspect of this invention is a method of providing and selecting from a menu on a display, wherein the invention includes a computer system with a graphical user interface having the display and a user interface selection device. A plurality of radio buttons is displayed on a Web page and each of the radio buttons is associated with a set of menu entries. A user is allowed to select one of the radio buttons and the set of menu entries associated with the selected radio button are then retrieved and displayed. A user is next allowed to select one entry out of the set of menu entries. The results corresponding to the user-selected entry are displayed on the Web page.

Preferably, the plurality of radio buttons is selected from a group consisting of: U.S. State, International and Format. The menu items corresponding to the "U.S. State" radio button can include: Arizona, California, Colorado, Connecticut, Delaware, District of Columbia, Florida, Georgia, Illinois, Indiana, Kansas, Kentucky, Louisiana, Maryland, Massachusetts, Michigan, Missouri, Nebraska, New York, North Carolina, Ohio, Oklahoma, Oregon, Pennsylvania, Rhode Island, South Carolina, Tennessee, Texas, Utah, Washington, Wisconsin and/or West Virginia, as well as any other state in the United States. Similarly, the menu items corresponding to the "International radio button can include: Argentina, Australia, Belgium, Brazil, Canada, Czech Republic, Germany, Greece, Hong Kong, Italy, Japan, Korea, Latvia, Mexico, Portugal, Sénégal, South Africa, Spain, Switzerland, Taiwan, Turkey, United Kingdom and/or United States, as well as any other country in the world. Further, the set of menu items corresponding to the "Format" radio button can include: Adult Contemporary, Alternative Rock, Christian Contemporary, Classic Rock, Classical, Country, International, Jazz, Miscellaneous, Modern Rock, News Radio, Oldies, Sports Radio, Talk Radio, Top 40 and/or Urban, as well as any other music format.

In another aspect of the present invention, computer-executable instructions display a Web page to a user on a client computer. After the user makes at least one selection on the Web page, search criteria are identified based on the selection made by the user. The client computer transmits the search criteria to a server. The server identifies at least one URL satisfying the user's search criteria. Preferably, the URL identifies a radio-station source of streaming-media content. The server returns the URL to the client computer where the URL is displayed in an IFRAME on the Web page. By displaying the URL in an IFRAME, the Web page need not be replotted each time the server identifies URLs satisfying the user selection criteria.

In still another aspect of the present invention, computer-executable instructions allow a user to assign at least one URL to at least one graphical object, such as a button, displayed on a Web page. Information identifying the user's assignment is stored in a data field of a cookie data structure. The computer-executable instructions use the information contained in the cookie data structure in order to assign the URL to the graphical object each time the Web page is displayed. Preferably, the URL identifies a radio-station source of streaming-media content.

BRIEF DESCRIPTION OF THE DRAWINGS

The present invention may take physical form in certain parts and steps, preferred embodiments of which will be described in detail in this specification and illustrated in the accompanying drawings which form a part hereof, wherein.

DETAILED DESCRIPTION OF THE INVENTION

The present invention provides methods and a data structure for assigning URLs (e.g., to radio-station-streaming-media-content sources) to graphical objects. For example, the present invention can use zip codes to identify and assign geographically relevant URLs to buttons. In addition, the graphical user interface of this invention allows users to select from a plurality of radio buttons and menu entries in order to identify search results satisfying the user's selection criteria. Further, an IFRAME is used to display search results so that Web pages need not be replotted each time a server identifies URLs satisfying the user selection criteria. Furthermore, this invention stores information identifying a user's button assignments or preferences (such as the user's zip code) in various data fields in a cookie data structure. The computer-executable instructions use the information contained in the cookie data structure in order to assign URLs to buttons each time the Web page is displayed. These and other aspects of the present invention are described in detail below.

Figure 1:
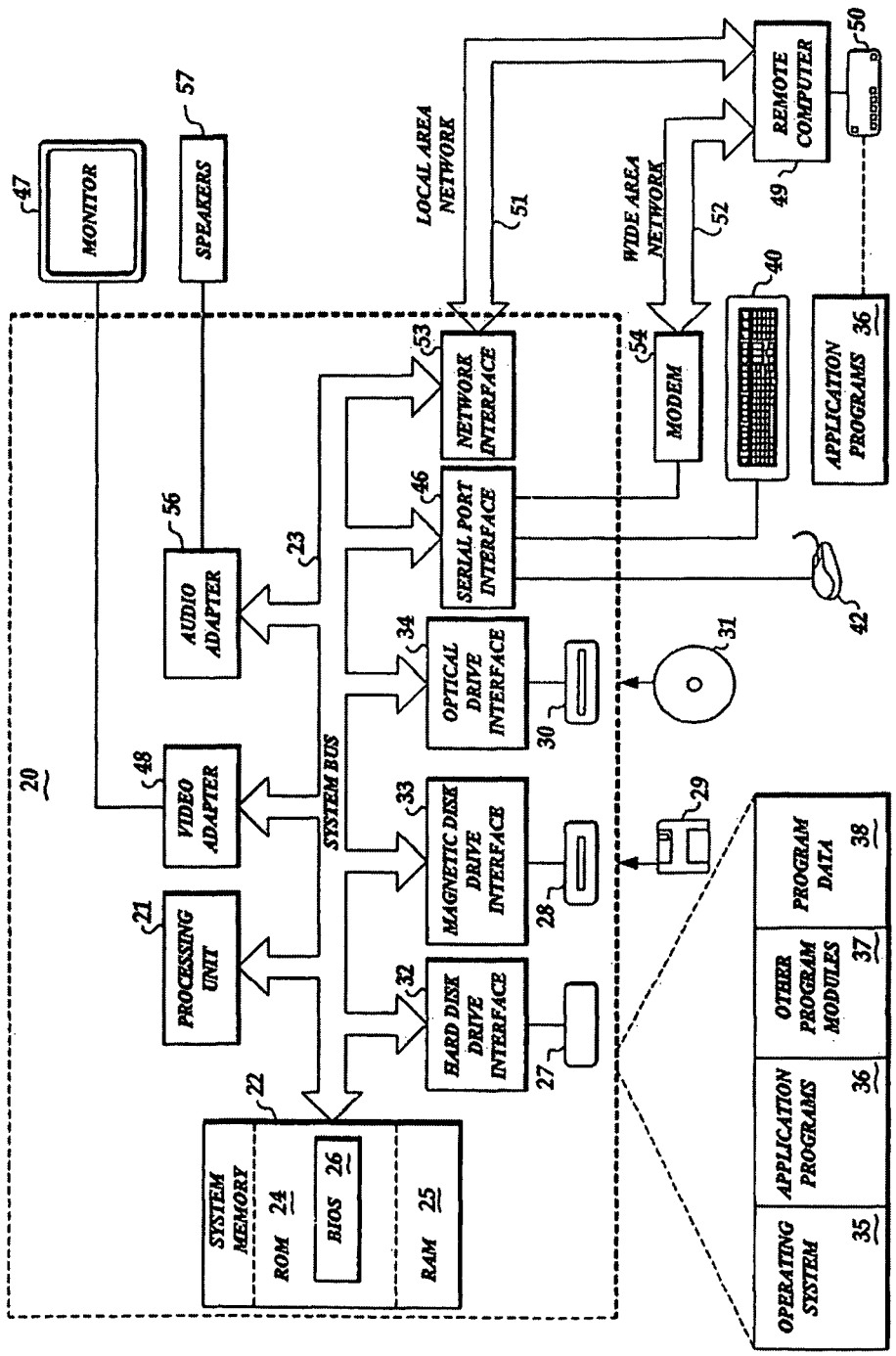
FIG. 1 is a block diagram of a general-purpose computer system for implementing the present invention.

In accordance with the present invention, a Web browser executes on a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22 and a system bus 23 that couples various system components including the system memory to the processing unit 21. The system bus 23 may be any of several types of bus structures including a memory bus or memory controller, a peripheral bus and a local bus using any of a variety of bus architectures. The system memory includes read-only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29 and an optical disk drive 30 for reading from or writing to a removable optical disk 31 such as a CD ROM or other optical media. The hard disk drive 27, magnetic disk drive 28 and optical disk drive 30 are connected to the system bus 23 by a hard disk drive interface 32, a magnetic disk drive interface 33 and an optical drive interface 34, respectively. The drives and their associated computer-readable media provide nonvolatile storage of computer-readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read-only memories (ROMs) and the like, may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computers 49 and 60. Each remote computer 49 or 60 may be another personal computer, a server, a router, a network PC, a peer device or other common network node and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
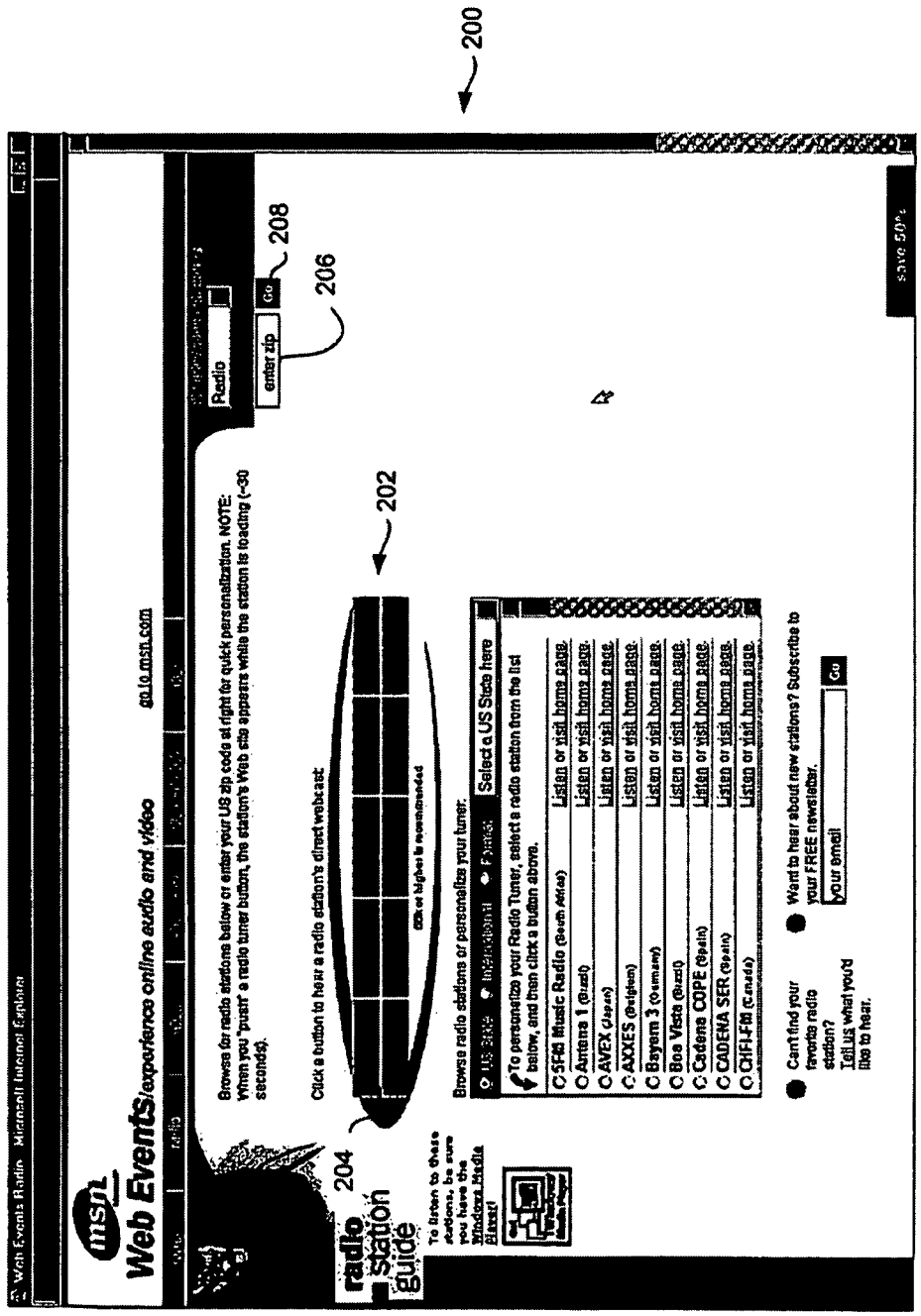
FIGS. 2 and 3 illustrate a Web browser displaying a Web page in accordance with the present invention wherein a text box is provided for manual input of a user's zip code and wherein buttons are provided for radio station selection.
Figure 3:
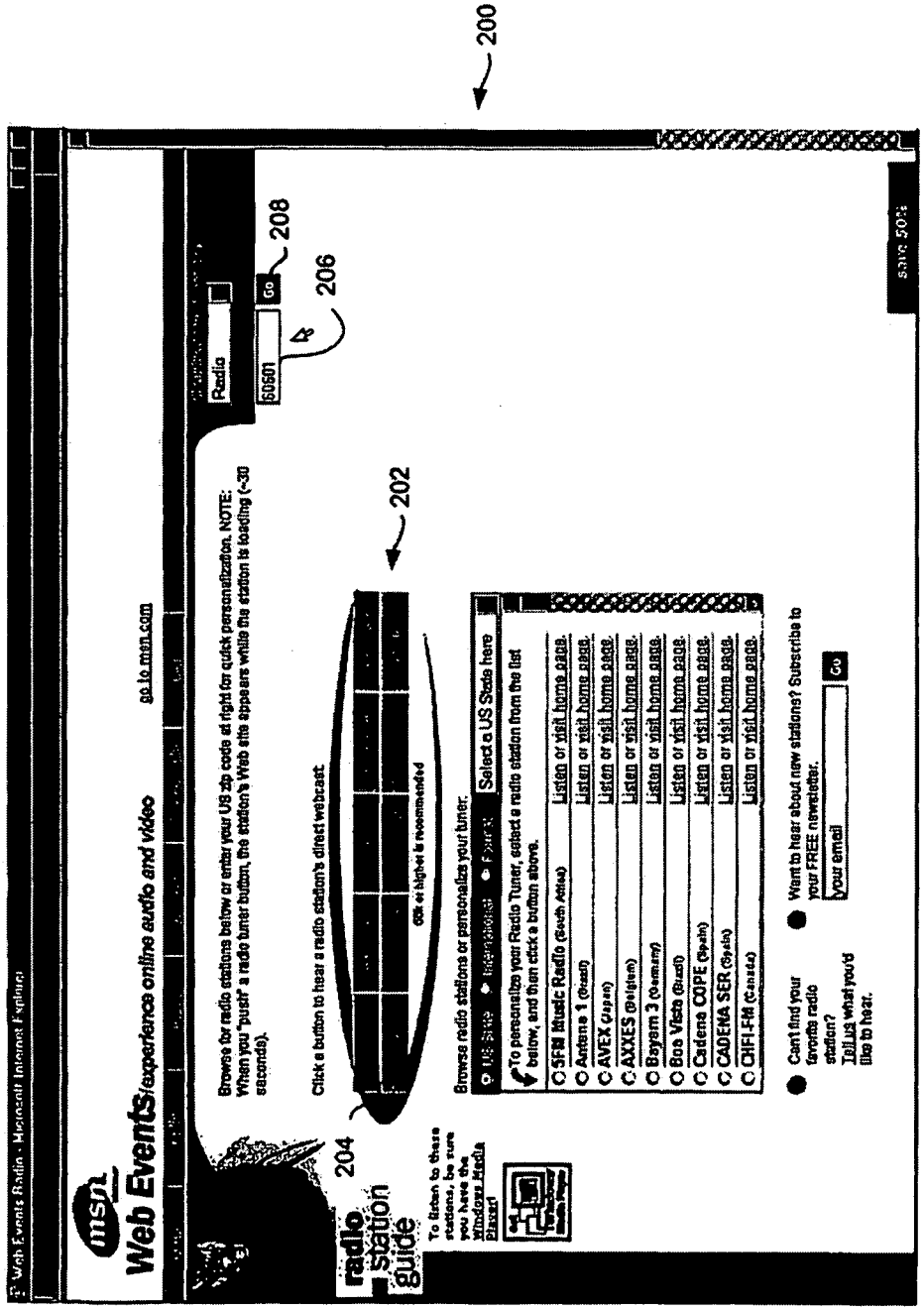

FIGS. 2 and 3 illustrate a Web browser displaying an exemplary Web page 200 in accordance with the present invention—with the only difference being that FIG. 2's zip-code text-entry box shows the instruction "enter text", whereas FIG. 3's zip-code text-entry box shows an actual zip code. As shown in the figures, a plurality of "radio buttons" is provided on the Web page. As used herein, "radio buttons" are defined as buttons that allow users to choose one—and only one— item from a group. A typical use of a group of radio buttons is to ask for an exclusive response. For example, when a user is asked how he or she would like to pay for an item, a user might be provided with a number of choices such as by credit card, cash, check or money order. Since the user should select one—and only one—method of payment, the radio buttons ensure that only one payment type is shown as selected.

One group of buttons on the Web page 200 is the preset-tuner buttons 202. Of course, persons of skill in the art will readily appreciate that only the circular objects adjacent the text "US State," "International" and "Format" are "radio buttons;" the text "US State," "International" and "Format" is merely text. The rectangular objects are "buttons" but are not "radio buttons". These buttons 202 are assigned to URLs identifying various streaming-media-content sources. In this example, the buttons 202 are assigned to radio stations; however, any streaming-media-content source or other content source could be used. Each button is labeled with sufficient text to identify the URL currently assigned to the button. For example, button 204 is assigned to CNN. If a user clicks on button 204, the Windows Media Player will contact the URL assigned to the button (i.e., CNN) and start playing the CNN broadcast on the local computer's speaker(s) 57.

A text box 206 is also provided on the Web page 200. The text box 206 allows a user to manually input his or her zip code. After a user enters a zip code, the user clicks on the "go" button 208. As shown in FIG. 3, a user could enter the zip code "60601" in text box 206 and then click on the "go" button 208. Alternatively, the user could simply enter the zip code and press enter. The Web browser sends this zip-code information to the server computer hosting the Web page 200. The server would then search its memory or search a database in order to identify at least one radio station (or other streaming-media-content sources) that is geographically relevant to the zip code. As used herein, the term "geographically relevant" means that it is possible for a user, who is located in a zip code, to use a standard radio antenna and receiver to listen to the radio station's broadcast. Of course, the "broadcast" is the radio station's wireless transmission through space of electromagnetic waves in the approximate frequency range from 10 kilohertz to 300,000 megahertz. Preferably, the server would search its memory or search its database in order to identify radio stations with broadcast towers that are geographically close to the zip code. As used herein, the term "geographically close" means that the broadcast tower is in close proximity to the zip code and, such as for example, located within 10, 20, 30, 40, 50, 60, 70, 80, 90 or 100 miles of any portion of the zip code. After this search is completed, the server returns the results of the search to the Web browser.

Figure 4:
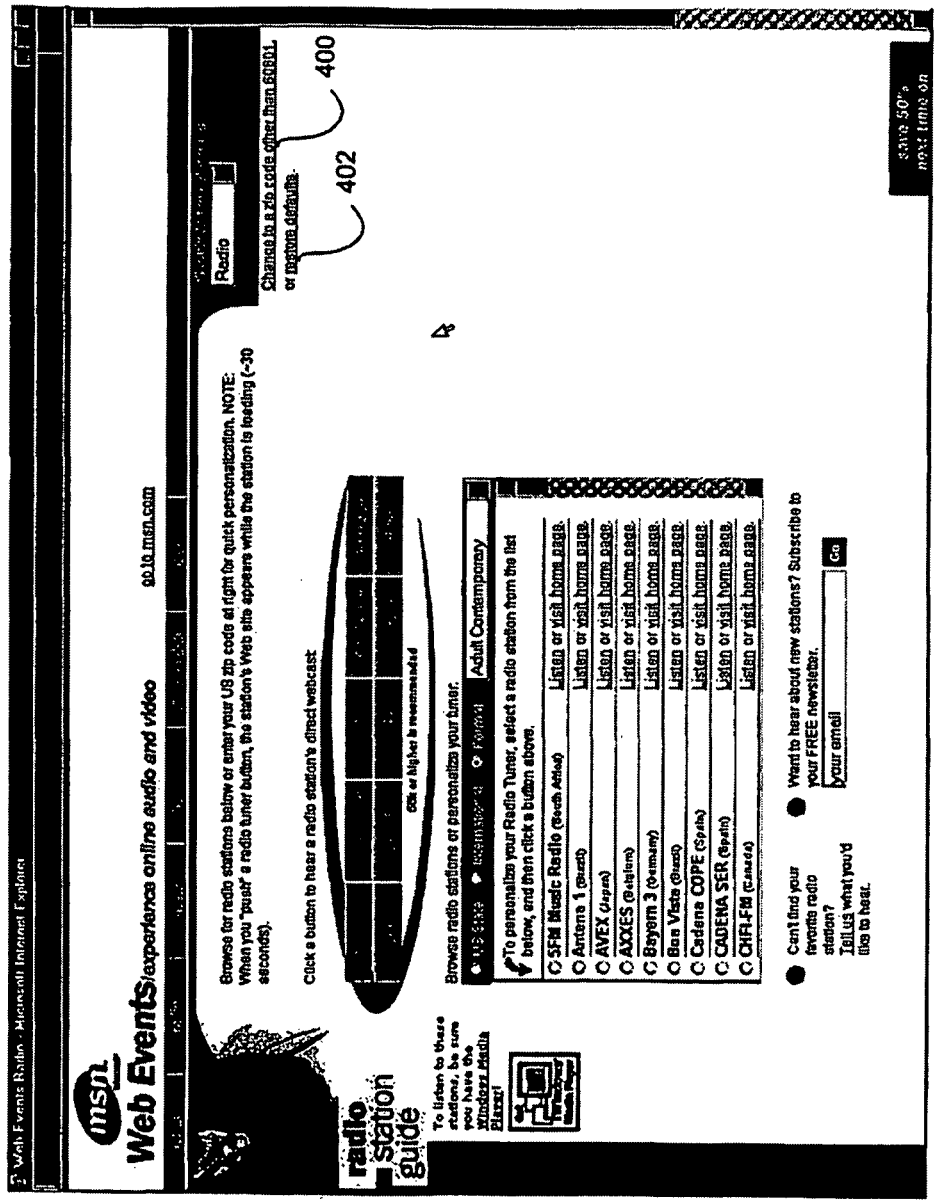
FIG. 4 shows a Web browser displaying, after a user has manually entered a zip code, a hyperlink identifying the current zip-code selection and enabling user modification of the zip-code selection, and buttons assigned radio-station names and corresponding URLs geographically relevant to the zip code.

FIG. 4 shows the resulting Web page 200 displayed by the Web browser after the server has returned the search results. Notably, the default values for the preset-radio-tuner buttons 202 have been changed. Previously, the default radio stations for the preset-tuner buttons were—as shown in FIG. 3: R. Free Virgin, BBC World, NPR, LAUNCH.com, Bloomberg, CNN, House of Blues, ZD TV Radio, Music Choice and MSNBC. After returning the search results for zip code "60601," the preset-tuner buttons 202 were assigned to URLs for radio stations geographically relevant to the zip code. In this example, the preset-tuner buttons were assigned to the following radio stations: WKQX, Flames Radio, NPR, LAUNCH.com, Bloomberg, CNN, House of Blues, ZD TV Radio, Music Choice and MSNBC. Thus, "R. Free Virgin" was changed to "WKQX" and "BBC World" was changed to "Flames Radio."

In addition to assigning at least one geographically relevant radio station to one of the preset-radio-tuner buttons 202, the Web page 200 also removed the text box 206 and "go" button 208. The text box 206 and button 208 were replaced with hyperlinks 400 and 402. A "hyperlink" is an element in an electronic document that links to another place in the same document or to an entirely different document. In this case, the hyperlink 400 identifies the user's current zip-code selection and enables the user to change the zip-code selection. Clicking on this hyperlink 400 redisplays text box 206 and "go" button 208 and allows the user to change the zip code. Similarly, hyperlink 402 allows the user to restore the default stations for the preset-tuner buttons 202.

Figure 5:
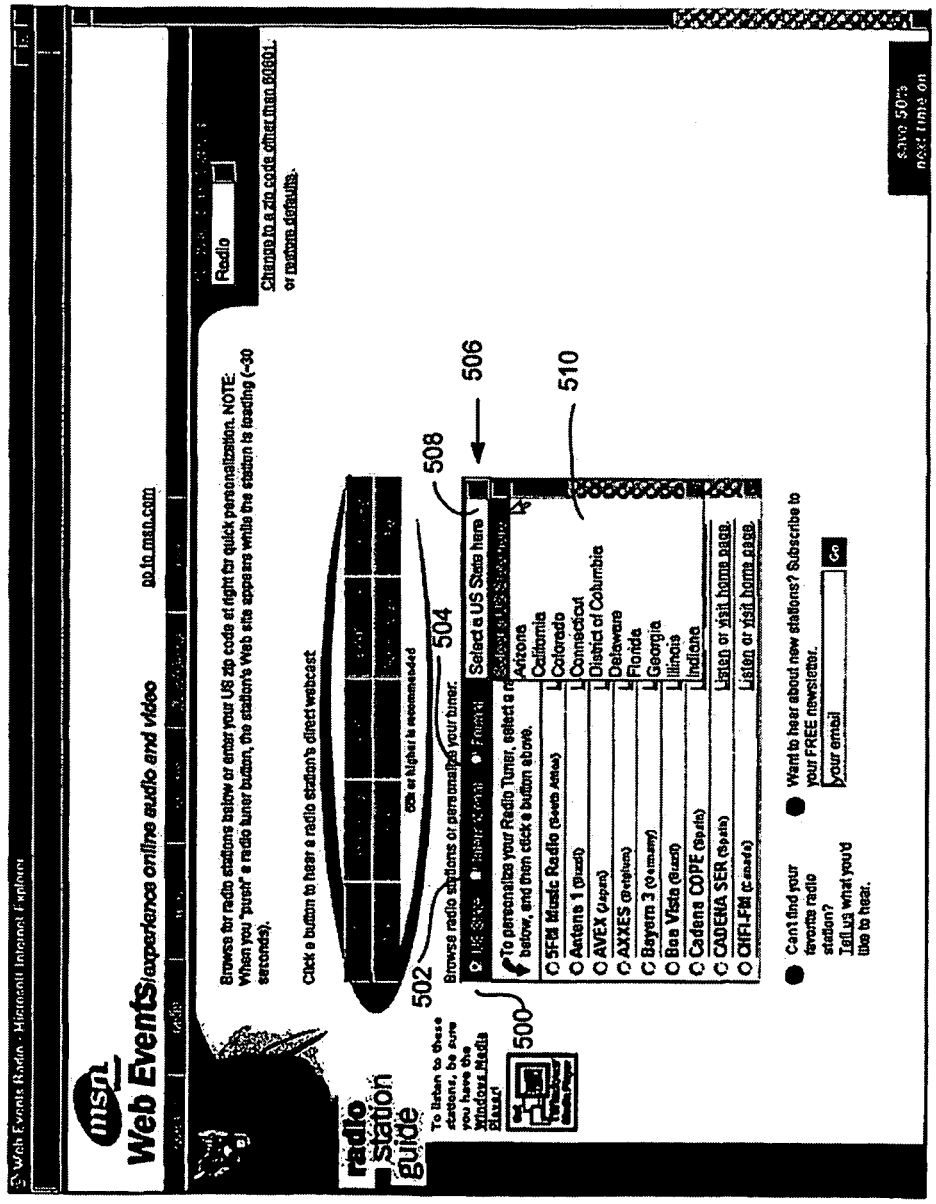
FIG. 5 depicts the Web page of FIG. 4 after a user has selected the "US State" radio button and clicked on the list box of menu entries for "US State;"
Figure 6:
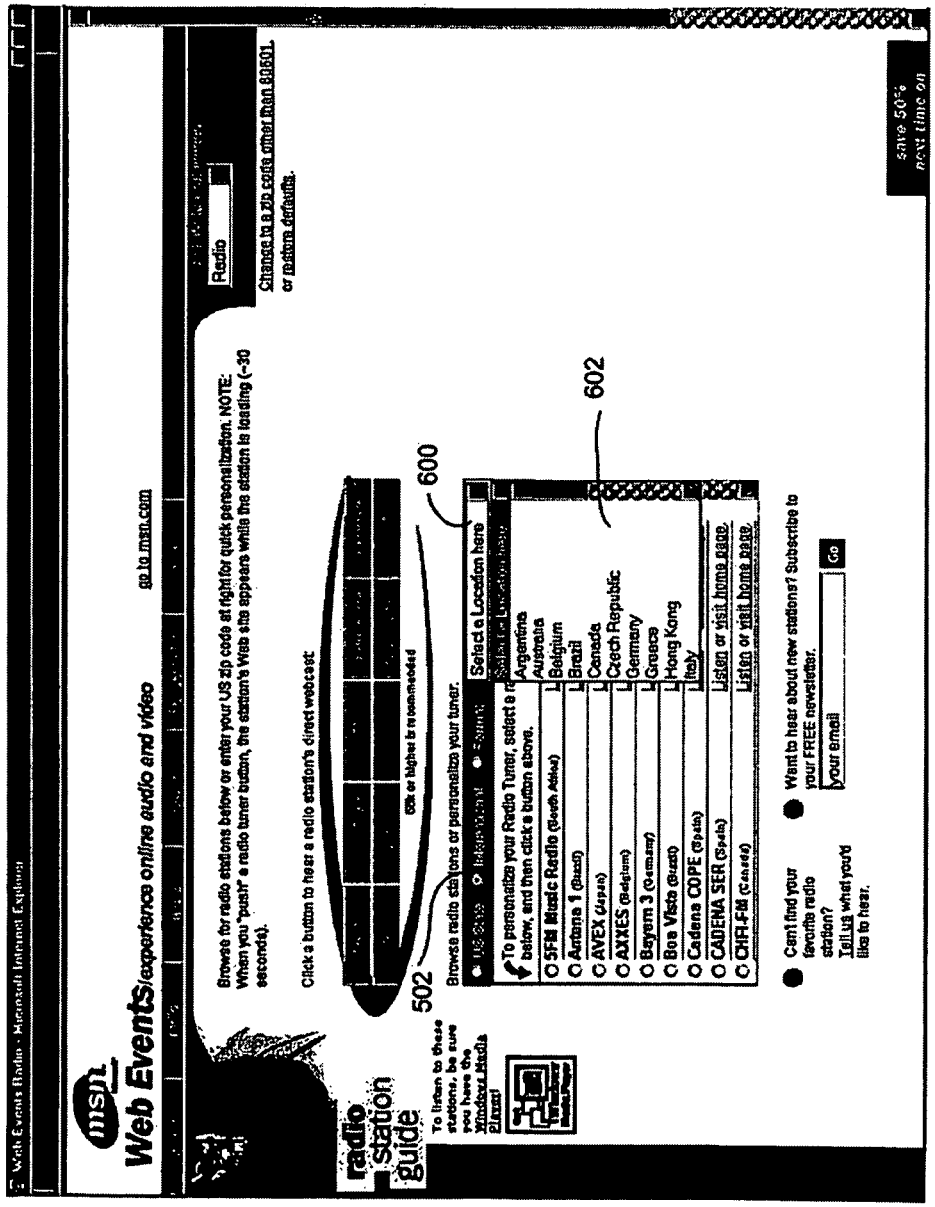
FIG. 6 shows the Web page of FIG. 4 after a user has selected the "International" radio button and clicked on the list box of menu entries for "International;"
Figure 7:
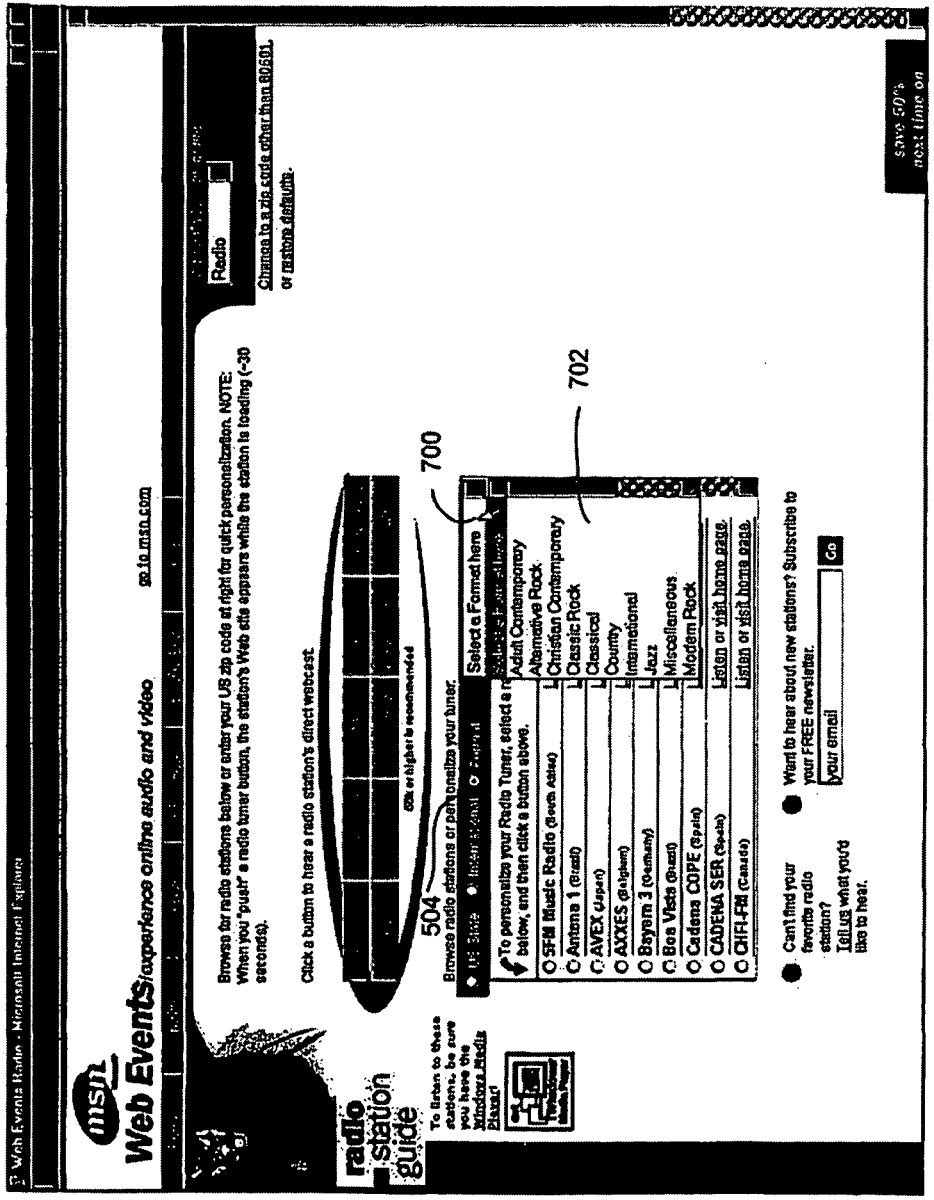
FIG. 7 illustrates the Web page of FIG. 4 after a user has selected the "Format" radio button and clicked on the list box of menu entries for "Format;"

As illustrated in FIGS. 5-7, the Web page 200 also contains radio buttons 500, 502 and 504, which are displayed in a header row 506. These radio buttons allow users to browse radio stations by US State 500, International 502 or Format 504. For example, when the US State radio button 500 is selected, a user can click on drop-down list box 508. A drop-down list of available states 510 is displayed. In this example, the drop-down list of available states 510 includes: Arizona, California, Colorado, Connecticut, Delaware, District of Columbia, Florida, Georgia, Illinois, Indiana, Kansas, Kentucky, Louisiana, Maryland, Massachusetts, Michigan, Missouri, Nebraska, New York, North Carolina, Ohio, Oklahoma, Oregon, Pennsylvania, Rhode Island, South Carolina, Tennessee, Texas, Utah, Washington, Wisconsin and West Virginia. However, any one or more of these states as well as any other state could be included in this list 510.

Similarly, when the International radio button 502 is selected, a user can click on drop-down list box 600 and a drop-down list of available countries 602 is displayed. The drop-down list of available countries 602, in this example, includes: Argentina, Australia, Belgium, Brazil, Canada, Czech Republic, Germany, Greece, Hong Kong, Italy, Japan, Korea, Latvia, Mexico, Portugal, Sénégal, South Africa, Spain, Switzerland, Taiwan, Turkey, United Kingdom and United States. Again, any one or more of these countries as well as any other country in the world could be included in this list 602.

Lastly, when the Format radio button 504 is selected, a user can click on drop-down list box 700 and a drop-down list of available musical formats 702 is displayed. Here, the drop-down list of available musical formats 702 includes: Adult Contemporary, Alternative Rock, Christian Contemporary, Classic Rock, Classical, Country, International, Jazz, Miscellaneous, Modern Rock, News Radio, Oldies, Sports Radio, Talk Radio, Top 40 and Urban. As before, any one or more of these musical formats as well as any other music format could be included in this list 702.

Figure 8:
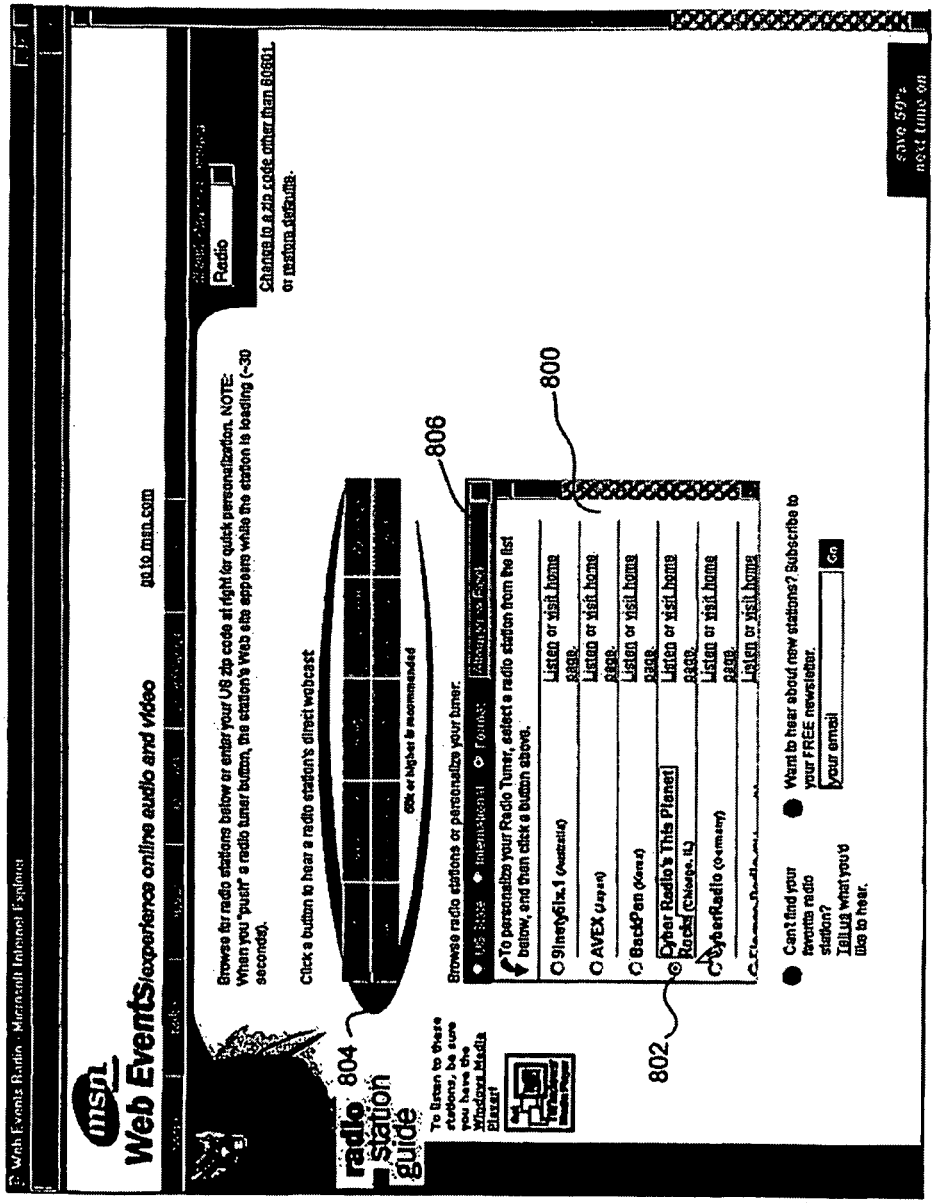
FIG. 8 depicts the Web page of FIG. 4 after a user has performed a search for Format/Alternative Rock and has selected the "Cyber Radio's This Planet Rocks" radio button.

After a user selects one of the US State 500, International 502 or Format 504 radio buttons and also selects one of the available items in one of the corresponding drop-down lists 510, 602 and 702, then the Web browser identifies the selections made by the user. The user's selection criteria are transmitted from the local computer to the server hosting the Web page 200. The server will search its memory or a database in order to identify radio stations matching the user's selection criteria. An HTML list of these radio stations will then be returned to the Web browser and displayed on the Web page 200. FIG. 8 provides an illustration of this. As shown, a user has selected the Format radio button 504 and has chosen Alternative Rock 806 for the musical format. In return, the server identified radio stations matching these criteria and displayed the results, preferably in an IFRAME 800, on the Web page 200.

An "IFRAME" is a block element and functions as a document within a document, or like a floating FRAME. IFRAMES are available in HTML and script as of Microsoft® Internet Explorer 3.0 and later. By displaying the search results in an IFRAME 800, there is no need for the Web browser to regenerate and replot the entire Web page 200. Only the contents of the IFRAME 800 are modified. Because only the contents of the IFRAME are modified, only these contents are sent from the server to the Web browser. In other words, the entire Web page 200 is not resent. Thus, the download time is minimized as well.

Figure 10:
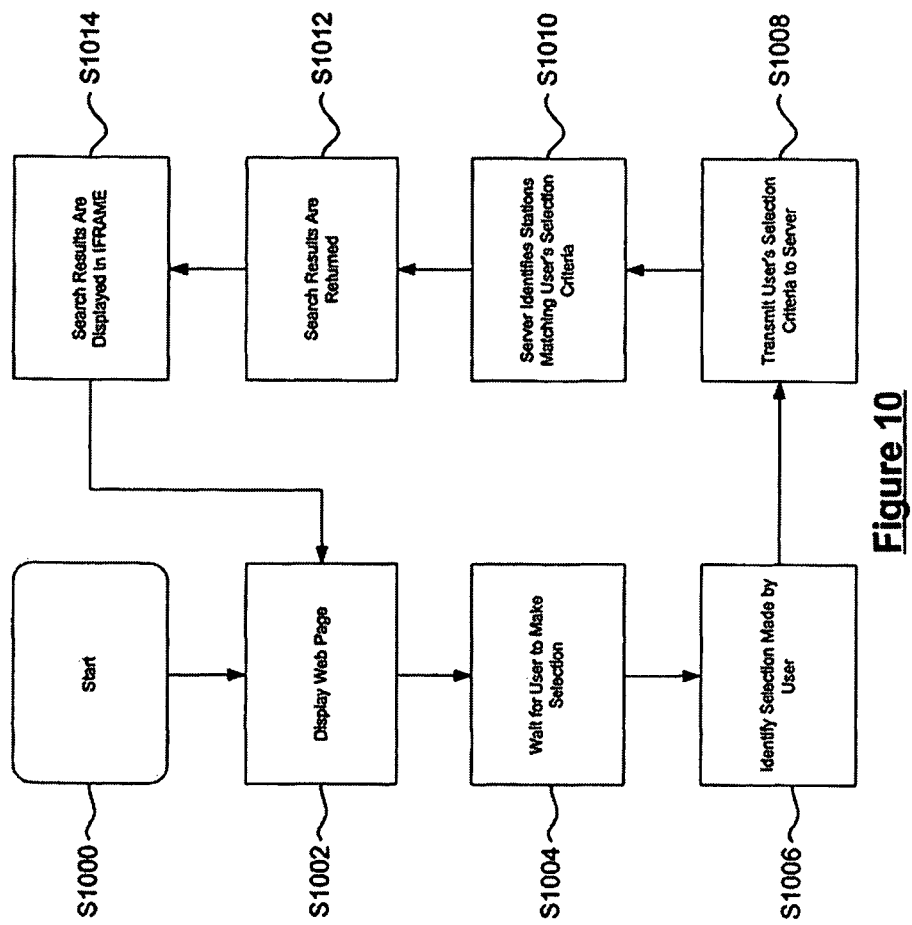
FIG. 10 is a flow diagram illustrating an exemplary process of identifying radio stations to display in an IFRAME on the Web page.

FIG. 10 shows a detailed a flow diagram for this exemplary process of identifying the radio-station search results to be displayed in the IFRAME 800 on the Web page 200. After the Web browser is started (S1000) and the Web page is displayed (S1002), the Web browser waits for the user to make a selection (S1004). After a selection is made (S1004), a JavaScript function (detailed below) identifies the selection(s) made by the user (S1006). The Web browser then transmits the user's selection criteria to the server hosting the Web page (S1008). The server next searches a database or its own server memory to identify radio stations that match the user's selection criteria (S1010). The search results are then returned to the Web browser (S1012). Preferably, the search results are returned in HTML format. The Web browser next displays the search results, preferably in an IFRAME on the Web page (S1014).

In sum, this process and the use of an IFRAME substantially increases performance of this system.

Figure 9:
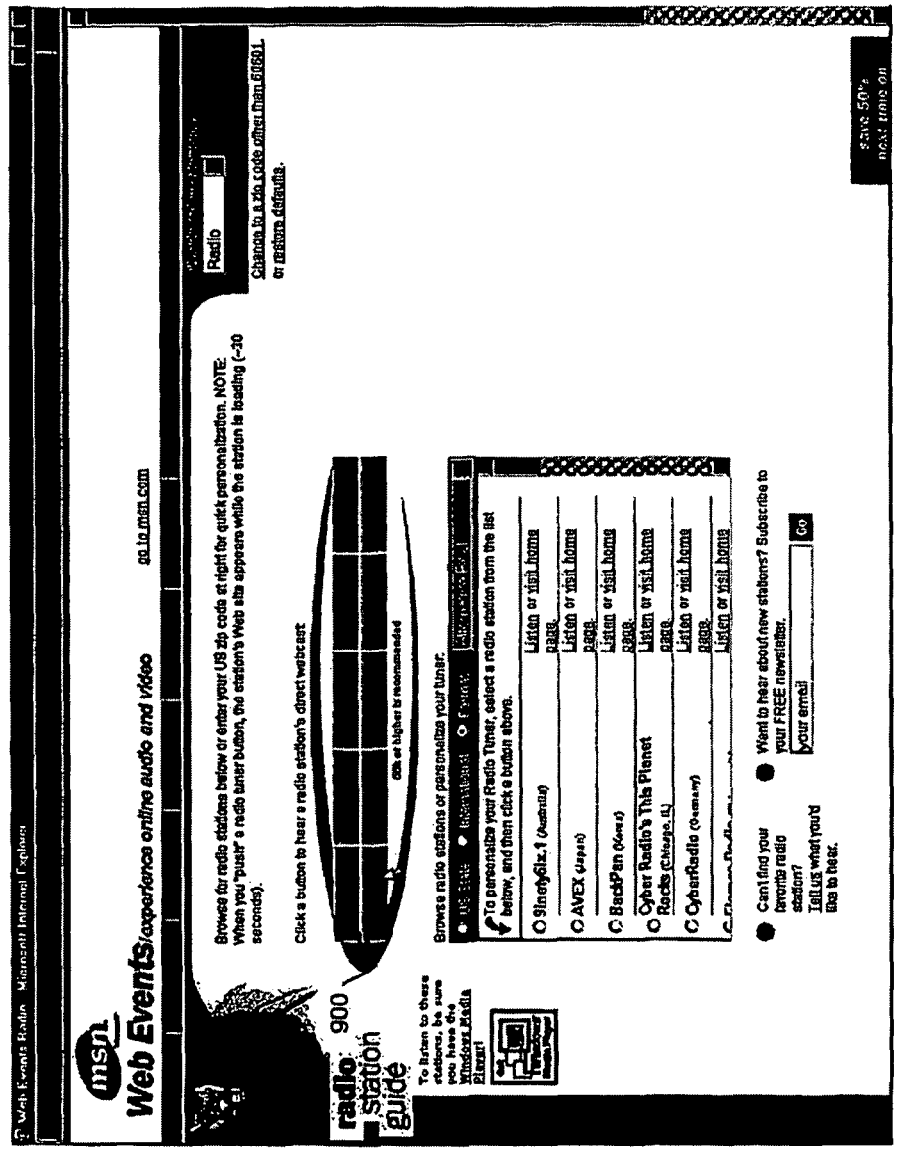
FIG. 9 shows the Web page of FIG. 8 after a user has assigned the name and corresponding URL for the "Cyber Radio's This Planet Rocks" radio station to the button formerly assigned to "CNN;"

FIGS. 8 and 9 illustrate another capability of the present invention—the ability to assign radio station URLs to preset-tuner buttons 202 after search results have been returned. As shown in FIG. 8, a radio button is adjacent to each radio station displayed in the IFRAME 800. If a user would like to assign the URL for the "Cyber Radio's This Planet Rocks" radio station to the preset-tuner button currently assigned to CNN 804, the user first clicks on the radio button for "Cyber Radio's This Planet Rocks" 802. Next, the user clicks on the CNN preset-tuner button 804. As depicted in FIG. 9, the URL for the "Cyber Radio's This Planet Rocks" radio station is then assigned to the radio button 900. The button 900 is next relabeled to reflect the new URL assignment for the button 900. This method can be used to assign any URL to any radio button or any other graphical object. Of course, skilled artisans will readily appreciate that the present invention is not limited to "radio buttons"—any graphical object could be utilized.

The present invention has yet another unique feature—namely the ability to remember each user's individual preferences and present-tuner—button assignments. This is accomplished by storing the relevant preferences and assignments on the local computer in the form of a data structure. One example of a suitable data structure is a cookie; however, any other type of data structure could be used. A "cookie" is a message (code string) given to a Web browser by a Web server. The Web browser stores the message in a text file on a computer-readable medium either on the local computer or on a remote site. The message is then sent back to the server each time the Web browser requests a Web page from the server.

Figure 11:
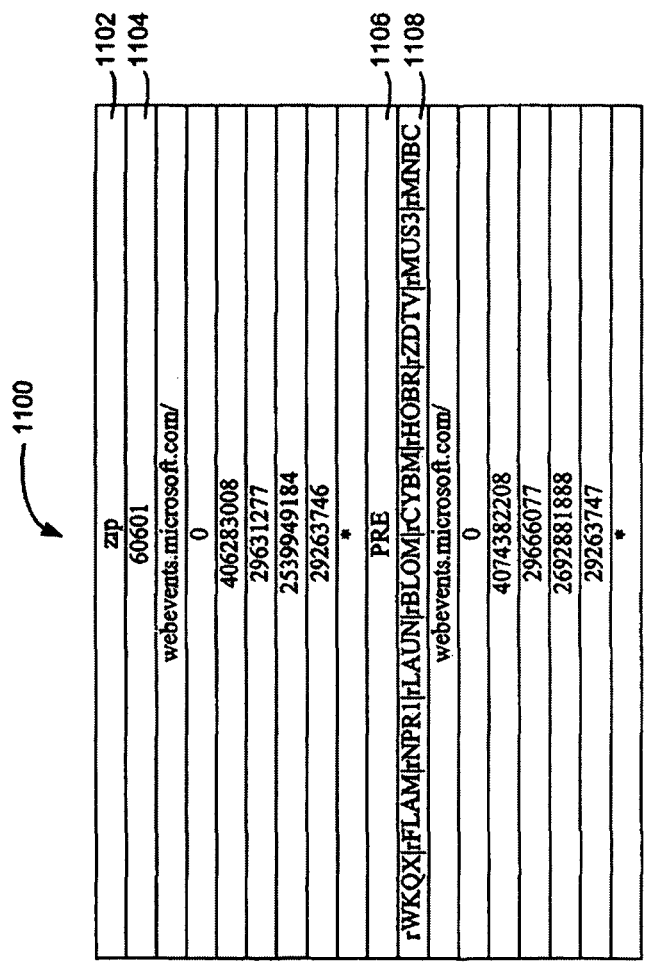
FIG. 11 shows various data fields contained in an exemplary cookie data structure that stores a user's zip-code and radio-station preferences.

With respect to the present invention, FIG. 11 shows various data fields contained in an exemplary cookie data structure 1100 that stores a user's zip code and radio station preferences. In the example shown in FIG. 11, data fields 1102 and 1104 in the cookie 1100 identify one stored variable as the zip code. This is denoted by the word "zip" in a data field stored in a first region of a range of memory addresses and is followed by the actual zip code "60601" that is stored in a second region of a second range of memory addresses. Similarly, data fields 1106 and 1108 identify the user's radio-station preferences for the preset-tuner buttons 202. This is denoted by the word "PRE" in a third data field stored in a third region of a third range of memory address and is followed by the radio-station preferences: rWKQX|rFLAM|rNPR1|rLAUN|rBLOM|rCYBM|rHOBR|rZDTV|rMUSI|rNBC| This is the actual cookie data structure for the Web page 200 and button assignments depicted in FIG. 9. Thus, the server uses the information contained in the cookie data structure 1100 in order to assign URLs to the preset-tuner buttons each time the Web page 200 is by the Web browser.

In order to provide skilled artisans with a detailed example of the present invention, the HTML source code for the Web page shown in FIGS. 2-9 is set forth in Appendix A and the "radio.asp" active server page referenced in the HTML source code is set forth in Appendix B. However, it should be understood that the present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit and scope of the invention. The specification and drawings are, therefore, to be regarded in an illustrative rather than restrictive sense. Accordingly, it is not intended that the invention be limited except as may be necessary in view of the appended claims.

What is claimed is:

1. A computer-readable hardware storage medium having computer-executable instructions for causing a computer to execute a method comprising:
   displaying a text box and a predefined structure having multiple graphical objects on a Web page, wherein each graphical object is user-assignable to a URL, the text box and the predefined structure being deployed on the Web page;
   receiving an input comprising a zip code entered into said text box;
   in response to the input, identifying at least one URL geographically relevant to said zip code, wherein said URL identifies a source of streaming-media content, said source of streaming-media content is a radio station, and said radio station is geographically close to said zip code;
   causing a user-defined association to be created between said at least one URL and at least one graphical object in the predefined structure effective to enable display of the predefined structure including the at least one graphical object at least one subsequent time when the Web page is displayed; and
   storing the zip code in a first data field of a data structure, the first data field stored in a first region of a range of memory addresses on the computer-readable medium;
   using the zip code contained in the data structure in order to assign said at least one URL to said at least one graphical object each time the Web page is displayed;
   replacing said text box on said Web page with at least one hyperlink, said hyperlink identifying the zip code that has been entered; and
   allowing user selection of the hyperlink in order to modify the zip code.

2. The computer-readable hardware storage medium of claim 1 wherein said at least one graphical object is a radio button.

3. The computer-readable hardware storage medium of claim 1 wherein the data structure is stored on a second computer-readable hardware storage medium.

4. The computer-readable hardware storage medium of claim 3 wherein the data structure is a cookie.

5. A computer-implemented method of providing and selecting from a menu on a display on a graphical user interface, the method comprising:
   displaying a plurality of radio buttons on a Web page, each of said radio buttons associated with a set of menu entries, wherein the plurality of radio buttons are selected from a group consisting of: U.S. State, International, and Format;
   receiving a first user input comprising a first selection of one of said radio buttons;
   retrieving the set of menu entries associated with a selected radio button, wherein the set of menu entries corresponding to said Format is selected from a group consisting of: Adult Contemporary, Alternative Rock, Christian Contemporary, Classic Rock, Classical, Country, International, Jazz, Miscellaneous, Modem Rock, News Radio, Oldies, Sports Radio, Talk Radio, Top 40, and Urban;
   displaying the set of menu entries associated with the selected radio button;

receiving a second user input comprising a second selection of one entry out of the set of menu entries;

displaying, on the Web page, results corresponding to the second selection, the results being associated with at least one URL geographically relevant to the second selection;

displaying a predefined structure having multiple graphical objects, wherein each graphical object is user-assignable to a URL; and causing a user-defined association to be created between the at least one URL and at least one graphical object in the predefined structure effective to enable display of the predefined structure including the at least one graphical object at least one subsequent time when the Web page is displayed.

6. A computer-readable hardware storage medium having computer-executable instructions that, when executed, cause a computer to perform a method comprising:

displaying a predefined structure having multiple graphical objects on a Web page, wherein each graphical object is user-assignable to a URL;

receiving a user input, at the same web page, to cause a user-defined association to be created between at least one URL and at least one graphical object of the multiple graphical objects in the predefined structure;

storing information identifying the user-defined association in a first data field of a data structure, the first data field stored in a first region of a range of memory addresses on the computer-readable medium, wherein said information is a zip code that is geographically close to a broadcast tower associated with said radio station; and using the information contained in the data structure in order to enable display of the predefined structure including said at least one graphical object at least one subsequent time when the Web page is displayed.

7. The computer-readable hardware storage medium of claim 6 wherein said at least one graphical object is a radio button.

8. The computer-readable hardware storage medium of claim 6 wherein said URL identifies a source of streaming-media content.

9. The computer-readable hardware storage medium of claim 8 wherein said source of streaming-media content is a radio station.

10. The computer-readable hardware storage medium of claim 9 wherein said information is an acronym identifying said radio station.

11. The computer-readable hardware storage medium of claim 6 wherein said data structure is stored on a second computer-readable medium.

12. The computer-readable hardware storage medium of claim 11 wherein said data structure is a cookie data structure.

13. The computer-readable hardware storage medium of claim 6 said at least one graphical object is a button other than a radio button.

\* \* \* \* \*